Dec. 9, 1930.  D. B. PERRY  1,783,978
LUBRICATING SYSTEM FOR CHAIN DRIVES
Filed March 16, 1929
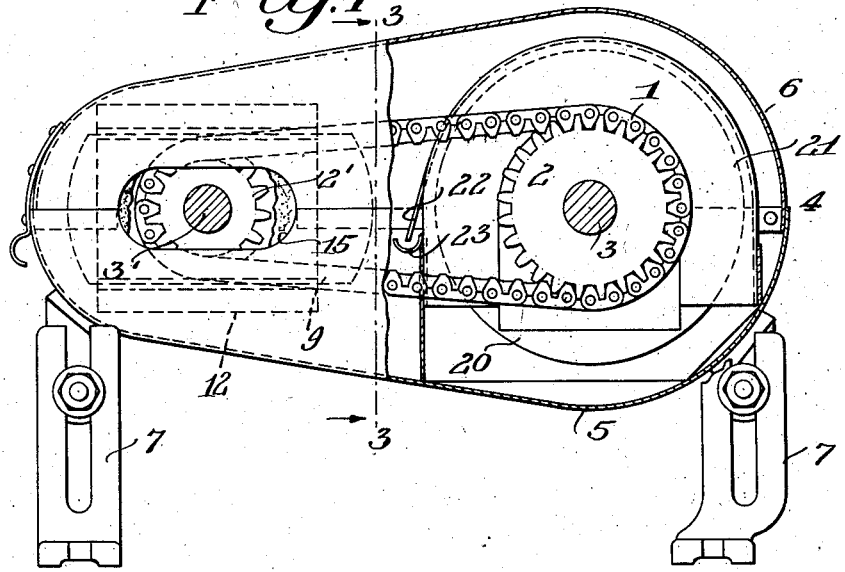
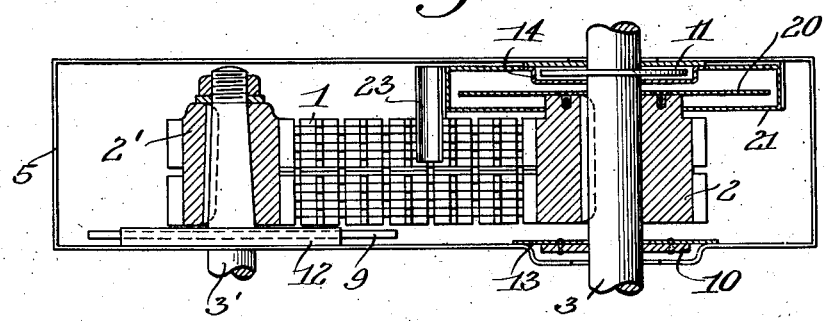
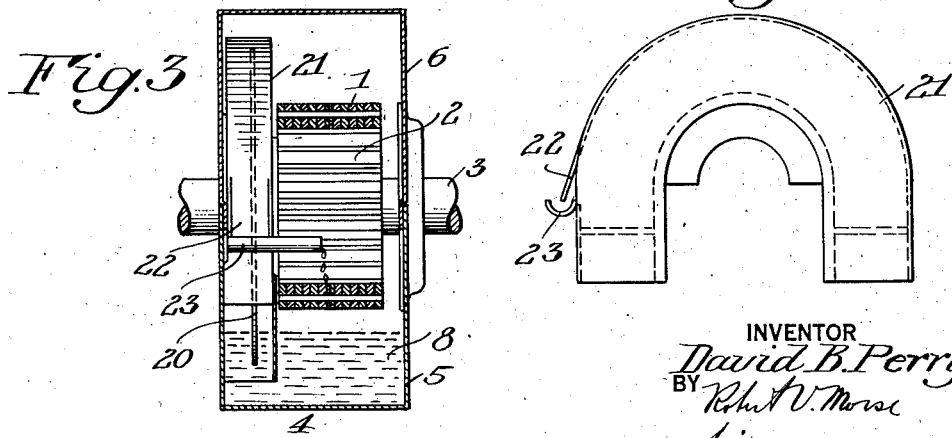
INVENTOR
David B. Perry
BY Robert V. Morse
his ATTORNEY Patented Dec. 9, 1930

1,783,978

UNITED STATES PATENT OFFICE

DAVID B. PERRY, OF ITHACA, NEW YORK, ASSIGNOR TO MORSE CHAIN COMPANY, OF ITHACA, NEW YORK, A CORPORATION OF NEW YORK

LUBRICATING SYSTEM FOR CHAIN DRIVES

Application filed March 16, 1929. Serial No. 347,553.

This invention relates to the lubrication of chains used for the transmission of power, which are generally enclosed in cases. These cases not only retain the lubricant, but protect the chain drive from dust, dirt and accidental contacts. It is wasteful and undesirable to run the chain directly thru a pool of oil in the bottom of the case, and the object of the present invention is to supply the chain drive with ample oil with less heating, churning or expenditure of power, and with less spraying or throwing of oil, so that the lubricant will not work out of the case and drip on the floor or adjacent machinery. Another object is to provide a mechanism which will operate satisfactorily with either direction of rotation. In general the objects are to provide a simple, practical and reliable lubricating system for chain drives.

In the drawings forming part of this specification,

Fig. 1 is a side elevation of a chain case constructed according to this invention;

Fig. 2 is a horizontal cross-section, with some of the parts in elevation, showing the lower half of the chain case with the upper half removed,—the upper part of the oil collecting guard being not shown.

Fig. 3 is a vertical cross-section mostly in elevation, taken on the line 3—3 of Fig. 2 looking in the direction of the arrows, showing the oil collecting guard and lubricating mechanism.

Fig. 4 is a detail view of the oil collecting guard.

The power transmission chain 1 is shown mounted on the sprocket wheels 2 and 2' which are carried on the shafts 3 and 3' respectively. The particular form of chain drive is immaterial, as the lubricating system to be described is generally applicable to various forms of drive chains, and the one shown is merely for purposes of illustration. This chain drive is shown enclosed by the case 4, which for purposes of convenience is usually built in the form of a lower half 5 and a removable upper half 6,—the upper part 6 fitting within the lower part 5 so as to prevent oil from leaking out at the joint.

The case 4 may be supported in any suitable manner as by the legs or brackets 7.

Lubricating oil 8 is normally retained in the lower portion 5 of the case 4, and is prevented from escaping along the shafts 3 and 3' by oil guards such as 9, 10, etc. These guards may be made in any of the usual forms, and in the case illustrated they consist of pieces of leather, board, fiber, or other suitable material, 9, 10, and 11, loosely mounted on each shaft where it passes thru the case. The wipers 9, 10, and 11 are loosely encased in housing members 12, 13, and 14, which are provided with holes somewhat larger than the shaft so as to allow ample room for play and adjustment. The holes around the shaft 3 are shown as the usual round construction, while an elongated hole 15 is provided in the case around the shaft 3' not only for play of the wiper but also to permit the same chain case 4 to be used with chain drives of various center distances, so that a few stock cases may be used to cover a wide variety of installations. If the chain drive is mounted on the end of a shaft the other side of the case 4 may be closed as shown, while if the shaft 3' extended thru a similar hole and guard would be used on that side of the case also.

The lubricating mechanism supplying oil to the chain 1 consists of a disk 20 secured to the shaft 3 or sprocket wheel 2 so as to rotate therewith, this disk 20 dipping into the oil 8 in the lower portion of the case 4. An oil collecting shell or housing 21 is mounted within the main case 4 and covers the upper part at least of the disk 20. This housing 21 not only prevents the oil from being thrown at random around the inside of the case 4 but also acts as a collecting medium by which a certain proportion of the oil is caught and conducted down the under side of the housing,—clinging thereto by capillary attraction,—and drips from the lip 22 into the trough or conductor pipe 23 which extends between the upper and lower strands of the chain 1. The oil then runs or drops from the pipe 23 to the chain 1 running beneath, and so is distributed thruout the running parts of the chain drive. It has been found from experience that a fair stream of oil is thus pumped and delivered regardless of the direction of rotation of the disk 20.

While the mechanism is particularly suitable for construction from sheet metal material, it may be constructed of any other suitable material, and it has the merits of simplicity, cheapness, and lightness. The dimensions, and arrangement of pipes, disks and collectors will of course be subject to considerable variation in different instances. While I have in the foregoing described the invention in a specific embodiment for purposes of illustration, it will be understood that it is merely by way of example, and that the invention is subject to various modifications and adaptations in different installations as will be apparent to those skilled in the art, without departing from the scope of the invention as set forth in the following claims.

I claim:

1. In a lubricating mechanism for chain drives, the combination of a case the lower portion of which forms an oil reservoir, a shaft extending into said case, a sprocket mounted on said shaft, a chain running on said sprocket, a disk member larger in diameter than said shaft and sprocket and mounted to rotate therewith, said disk dipping into the oil reservoir, a collector member spaced radially from the disk and adapted to catch oil thrown centrifugally from the disk, said collector having a lip or drip edge, and a conductor adapted to receive oil collected by the underside of the collector member and falling from the lip or drip edge and discharge it so as to fall upon the lower strand of the chain.

2. In a lubricating mechanism for chain drives, the combination of a chain case including an oil reservoir, shafts extending into said case, sprockets mounted on said shafts, a chain running on said sprockets, a disk member mounted to rotate with one of the sprockets and dipping into the oil reservoir, said disk member being larger in diameter than the sprocket with which it rotates, a collector member extending over the upper portion of the disk member and adapted to catch oil thrown centrifugally from the disk member, a conductor adapted to receive the oil running down the under side of the collector member, said conductor extending between the sprockets and arranged to discharge oil upon the lower strand of the chain.

3. In a lubricating mechanism for chain drives, the combination of a chain case having an upper and lower portion and including an oil reservoir, the upper portion of the case being removable, a collector member mounted in the lower portion of the case so as not to be disturbed by removal of the upper portion, shafts extending into said case, oil guards on said shafts where they pass thru said case, sprockets mounted on said shafts, a chain running on said sprockets, a disk member mounted to rotate with one of said sprockets and dip into the oil reservoir below said sprocket, said disk member being located within the collector member so as to discharge oil centrifugally thereto, a projection from which the oil running down the under side of the collector member may drip, and a conductor adapted to receive oil from said projection and discharge it between the sprockets so as to fall upon the lower strand of the chain.

In testimony whereof I have hereunto signed my name this 15th day of March, 1929.

DAVID B. PERRY.